United States Patent
Mohrlock et al.

(10) Patent No.: US 9,108,482 B2
(45) Date of Patent: Aug. 18, 2015

(54) TORSION BAR SPRING ARRANGEMENT FOR A WHEEL SUSPENSION OF A MOTOR VEHICLE

(71) Applicant: Audi AG, Ingolstadt (DE)

(72) Inventors: Dominik Mohrlock, Ingolstadt (DE); Andreas Schindler, Ingolstadt (DE); Heinrich Beringer, Denkendorf (DE); Joachim Schmitt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/181,269

(22) Filed: Feb. 14, 2014

(65) Prior Publication Data

US 2014/0232083 A1     Aug. 21, 2014

(30) Foreign Application Priority Data

Feb. 16, 2013   (DE) .......................... 10 2013 002 713

(51) Int. Cl.
| | |
|---|---|
| *B60G 17/02* | (2006.01) |
| *B60G 11/18* | (2006.01) |
| *B60G 11/15* | (2006.01) |
| *B60G 11/48* | (2006.01) |

(Continued)

(52) U.S. Cl.
CPC .............. *B60G 17/025* (2013.01); *B60G 11/15* (2013.01); *B60G 11/183* (2013.01); *B60G 11/48* (2013.01); *B60G 11/50* (2013.01); *B60G 21/0555* (2013.01); *B60G 2202/12* (2013.01); *B60G 2202/134* (2013.01); *B60G 2202/42* (2013.01); *B60G 2204/1224* (2013.01); *B60G 2206/604* (2013.01)

(58) Field of Classification Search
CPC ...... B60Q 7/001; B60Q 11/18; B60Q 11/183; B60Q 17/00; B60Q 17/025; B60Q 21/05; B60Q 21/055; B60Q 21/0551; B60Q 21/0553; B60Q 21/0588; B60Q 2202/13; B60Q 2202/134; B60Q 2202/135; B60Q 2202/1351; B60Q 2204/122; B60Q 2204/124; B60Q 2206/427
USPC ............. 280/5.508, 5.511, 124.106, 124.107, 280/124.152, 124.166; 267/188, 273, 277, 267/284
See application file for complete search history.

(56) References Cited

U.S. PATENT DOCUMENTS

| | | | | |
|---|---|---|---|---|
| 2,480,934 | A | * | 9/1949 | Franc ............................. 267/284 |
| 2,815,961 | A | * | 12/1957 | Brueder ................. 280/124.143 |
| 3,615,081 | A | * | 10/1971 | Ravenel ........................ 267/279 |

(Continued)

FOREIGN PATENT DOCUMENTS

| | | |
|---|---|---|
| DE | 37 34 698 | 7/1988 |
| DE | 10 2004 004 3335 | 8/2005 |

(Continued)

*Primary Examiner* — Ruth Ilan
*Assistant Examiner* — Barry Gooden, Jr.
(74) *Attorney, Agent, or Firm* — Henry M. Feiereisen LLC

(57) ABSTRACT

A torsion bar spring arrangement for a wheel suspension of a motor vehicle includes an actuator arranged on a vehicle body or on a subframe and constructed to variably pre-tension the torsion bar spring arrangement, a coaxial first torsion bar spring having an output side that is connected by way of an output lever to a wheel suspension element of the wheel suspension, and a housing of the actuator supported on the vehicle body in at least one bearing location for movement in a circumferential direction and resiliently yieldingly supported on the vehicle body in the direction of torsional moments acting on the torsion bar spring by way of at least one spring element.

15 Claims, 5 Drawing Sheets

(51) Int. Cl.
   *B60G 11/50*       (2006.01)
   *B60G 21/055*      (2006.01)

(56) References Cited

U.S. PATENT DOCUMENTS

| | | | |
|---|---|---|---|
| 3,778,082 A * | 12/1973 | Grosseau | 280/124.13 |
| 4,415,178 A * | 11/1983 | Hatsushi et al. | 280/124.145 |
| 5,288,101 A | 2/1994 | Minnett | |
| 5,927,737 A * | 7/1999 | Hoefer | 280/124.166 |
| 7,267,142 B2 * | 9/2007 | Lothar | 140/89 |
| 8,505,888 B2 * | 8/2013 | Whitaker et al. | 267/273 |
| 8,511,697 B2 * | 8/2013 | Ohletz et al. | 280/124.13 |
| 8,562,009 B2 * | 10/2013 | Michel | 280/124.137 |
| 8,616,569 B2 * | 12/2013 | Ohletz et al. | 280/124.13 |
| 8,827,287 B2 * | 9/2014 | Michel | 280/124.106 |
| 2002/0190486 A1 | 12/2002 | Phillis | |
| 2005/0073126 A1 * | 4/2005 | Seki | 280/124.152 |
| 2005/0167932 A1 | 8/2005 | Munster | |
| 2008/0150250 A1 | 6/2008 | Preukschat et al. | |
| 2011/0278811 A1 * | 11/2011 | Ohletz et al. | 280/124.106 |
| 2011/0278812 A1 | 11/2011 | Ohletz et al. | |
| 2012/0256387 A1 * | 10/2012 | Michel | 280/124.134 |
| 2012/0256473 A1 | 10/2012 | Schmid et al. | |
| 2012/0306174 A1 | 12/2012 | Schmid et al. | |
| 2013/0127131 A1 * | 5/2013 | Michel | 280/124.106 |
| 2013/0241168 A1 * | 9/2013 | Michel | 280/124.166 |

FOREIGN PATENT DOCUMENTS

| | | | |
|---|---|---|---|
| DE | 102004002550 | 8/2005 | |
| DE | 10 2006 31 414 | 1/2007 | |
| DE | 102005031414 | 1/2007 | |
| DE | 102006061984 | 2/2008 | |
| DE | 10 2007 007 214 | 8/2008 | |
| DE | 10 2007 024 770 | 11/2008 | |
| DE | 102009005895 | 7/2010 | |
| DE | 102009005899 | 7/2010 | |
| DE | 102009047128 | 5/2011 | |
| DE | 10 2010 041 404 | 3/2012 | |
| DE | 10 2011 053 278 | 3/2012 | |
| DE | 102010042223 | 4/2012 | |
| EP | 1 184 215 | 3/2002 | |
| EP | 1 580 046 A2 | 10/2004 | |
| EP | 1 609 634 | 12/2005 | |
| EP | 1609634 A1 * | 12/2005 | B60G 17/027 |
| EP | 2 322 366 | 5/2011 | |
| EP | 2 508 368 | 10/2012 | |
| FR | 1.489.223 | 7/1967 | |
| JP | H2-3519 | 1/1990 | |
| WO | WO2007/098743 A1 | 9/2007 | |

* cited by examiner

TORSION BAR SPRING ARRANGEMENT FOR A WHEEL SUSPENSION OF A MOTOR VEHICLE

CROSS-REFERENCES TO RELATED APPLICATIONS

This application claims the priority of German Patent Application, Serial No. 10 2013 002 713.6, filed Feb. 16, 2013, pursuant to 35 U.S.C. 119(a)-(d), the content of which is incorporated herein by reference in its entirety as if fully set forth herein.

BACKGROUND OF THE INVENTION

The present invention relates to a torsion bar spring arrangement for a wheel suspension of a motor vehicle.

The following discussion of related art is provided to assist the reader in understanding the advantages of the invention, and is not to be construed as an admission that this related art is prior art to this invention.

In conventional torsion bar spring arrangements, the torsion bar spring is composed of only two components, namely a tubular spring and solid bar spring. The remaining components in the load path are designed to be absolutely rigid without affecting the overall spring constant of the system. For example, when a softer torsion bar spring needs to be realized, a first measure would include a reduction of the diameter of tubular spring and/or of the solid bar spring. However, the working capacity of the torsion bar would decrease by reducing the diameter, and the stresses would simultaneously increase disproportionately, so that the tubular spring and solid bar spring would have to be lengthened. However, such a change in length is not feasible due to the extremely critical space situation in the area of the wheel suspension. As a result, especially with the smaller vehicle production runs, where a reduction of the total spring stiffness is essential, such a rotary actuator can not be installed due to the high packing density.

It would therefore be desirable and advantageous to obviate prior art shortcomings and to provide an improved torsion bar spring arrangement for a wheel suspension of, in particular, a two-track vehicle, wherein the spring rate of the torsion spring can be additionally influenced by simple structural designs.

SUMMARY OF THE INVENTION

According to one aspect of the present invention, a torsion bar spring arrangement for a wheel suspension of a motor vehicle includes an actuator arranged on a vehicle body or on a subframe and constructed to variably pre-tension the torsion bar spring arrangement, a coaxial first torsion bar spring having an output side that is connected by way of an output lever to a wheel suspension element of the wheel suspension, and a housing of the actuator supported on the vehicle body in at least one bearing location for movement in a circumferential direction and resiliently yieldingly supported on the vehicle body in the direction of torsional moments acting on the torsion bar spring by way of at least one spring element.

According to the invention, it is proposed that the housing of the actuator is no longer rigidly mounted on the vehicle body without having a resilient property, but is mounted resiliently yielding at a body-side bearing point of the vehicle with a defined spring rate. In this way, a resilient component is connected upstream in series with the torsion bar spring in a simple manner, or superimposed, which lowers the spring rate of the spring arrangement and reduces the torsional loads on the torsion bar springs.

Optionally, a nested torsion bar spring arrangement composed of a tubular spring and a solid bar spring may be augmented with the spring-elastic bearing of the motor-gear unit. Thereby, the total spring rate can be adjusted downward while maintaining the geometric dimensions, i.e. the length of the torsion bar spring arrangement. Accordingly, the rotary actuator can then also be installed with smaller vehicle production runs, where a reduction in the overall stiffness of the wheel suspension is required.

According to another advantageous feature of the present invention, the motor-gear unit may be mounted at the bearing point on the vehicle body so as to be movably in the circumferential direction and may be supported on the vehicle body by at least one spring element in the direction of the torsion moments acting on the rotary bar springs. This proposed arrangement quasi divides the torsion bar spring arrangement into the torsion bar and the additional spring element, namely with an interposed motor-gear unit. The motor-gear unit produces the variable pre-tension in a conventional manner, whereas the torsional moment is supported by the output lever and the torsion bar spring is supported on the actuator unit and on the vehicle body (or subframe) by the housing of the actuator unit via the spring element. This advantageously produces a simpler design of the motor-gear unit in conjunction with a simplified, in particular shorter torsion bar spring.

According to another advantageous feature of the present invention, at least one radially outwardly projecting lever, which is clamped between two opposing springs supported on the vehicle body, may be mounted on the motor-gear unit or on its housing. This produces a dynamically sensitive torsion bar spring arrangement having a defined central position, for example, in a design position of the wheel suspension, and high-frequency matching of the trim with the compression and/or rebound movements of the wheel suspension.

The springs may preferably be formed by coil compression springs and/or by rubber-elastic buffers. The buffers may at the same time also be designed as progressively acting spring stops.

According to another advantageous feature of the present invention, the spring element may be composed of at least one coil spring arranged around the motor-gear unit and acting in both rotation directions, with the spring ends being anchored on the vehicle body and the motor-gear unit. When little additional installation space surrounding the rotatable mounted motor-gear unit is available, the coil spring which also has a defined torsional rigidity may be designed so as to be able to absorb from a central position (design position) rebound and compression movements commensurate with the defined spring deflection.

Due to the additional spring element on the rotatably mounted motor-gear unit, the rotary bar spring may be designed as a single piece and drivingly connected at one end with the output lever and at its other end with the output element of the motor-gear unit. A simple, inexpensive torsion bar spring can then be employed and the motor-gear unit can have a simple design for easy production which need not be designed as a hollow-shaft assembly with an internal torsion bar spring.

The additional spring element may be an additional torsion bar spring supported on the housing of the motor-gear unit which is supported at its free end on the vehicle body. The torsion bar spring may be connected with one end to the actuator housing and supported with the other end on a torque support on the vehicle body. The first torsion bar spring extending to the output lever and the second torsion bar spring supported on the torque support and/or the cylindrical housing of the motor-gear unit of the actuator may be constructed coaxially with respect to each other.

The first torsion bar spring and the second torsion bar spring may also be arranged at the opposing end faces of the cylindrical housing of the motor-gear unit of the actuator.

Furthermore, to attain a structurally simple design, the first torsion bar spring may be made as a single piece, for example, of spring steel and may be drivingly connected at one of its ends to the output lever and at its other end to the output element of the motor-gear unit.

Lastly, two torsion bar spring arrangements oriented transversely to the vehicle's longitudinal direction may be provided on an axle of the vehicle (front and/or rear axle), wherein their motor-gear units are positioned (inside) in the area of the vehicle's vertical longitudinal center plane, whereas the torsion bar spring or the torsion bar spring with the output lever are positioned at the outside. Furthermore, the motor-gear unit may also be aligned in the longitudinal direction.

The aforedescribed advantageous embodiments and/or modifications of the invention, which are also recited in the dependent claims, can be employed either individually or in any combination with each other—except for example in cases of clear dependencies or incompatible alternatives.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
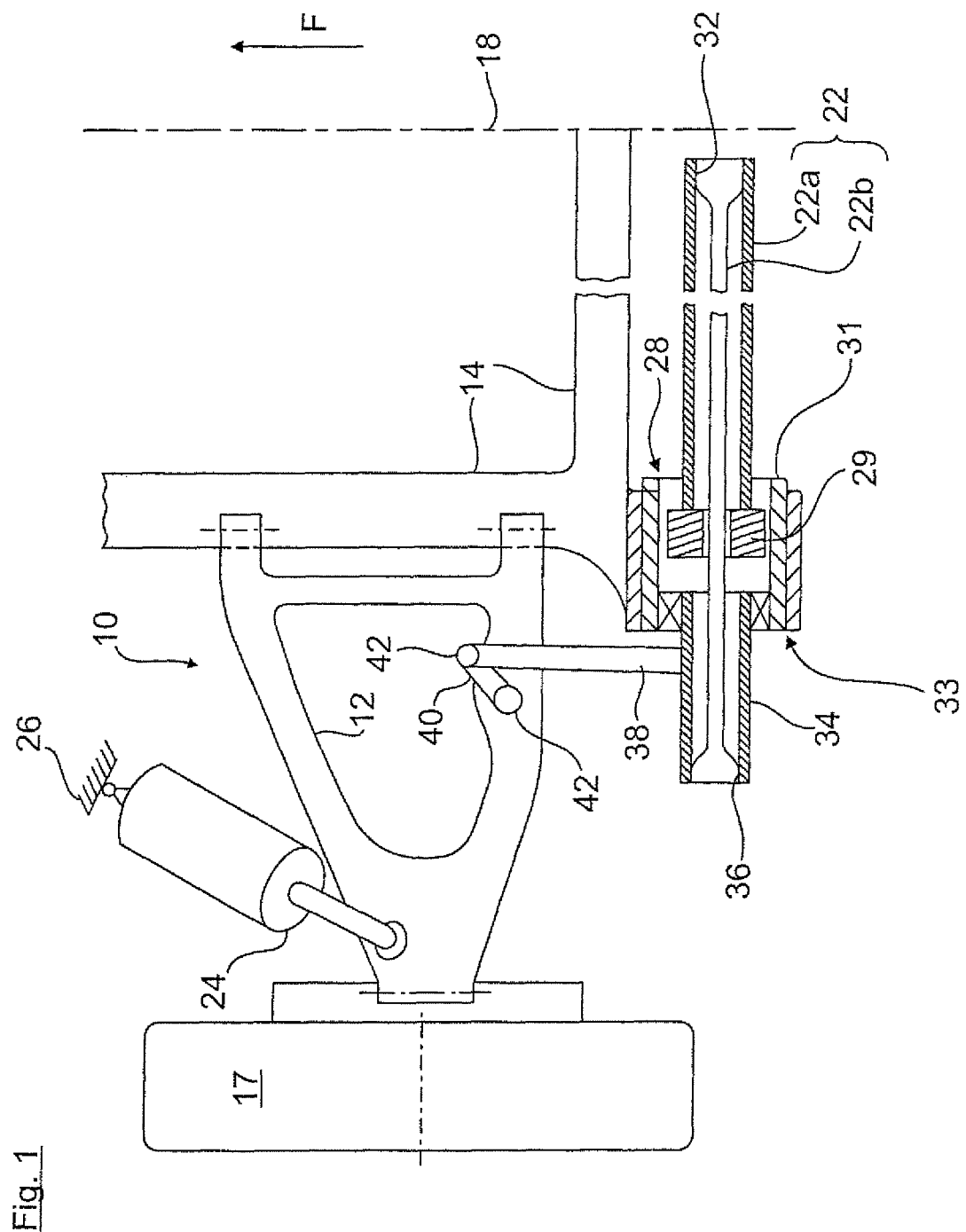
FIG. 1 is a plan view on the lower plane of a left-side wheel suspension of a rear axle of a motor vehicle, with a lower transverse control arm, a shock absorber and a torsion bar spring arrangement according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a lower plane of a left-side wheel suspension for motor vehicles designated by 10, with a lower transverse control arm 12 which is articulated, on the one hand, on an only partially shown subframe 14 and, on the other hand, on an only schematically indicated wheel carrier for a rear wheel 17. The upper control arm guiding the wheel carrier is not shown.

Figure 2:
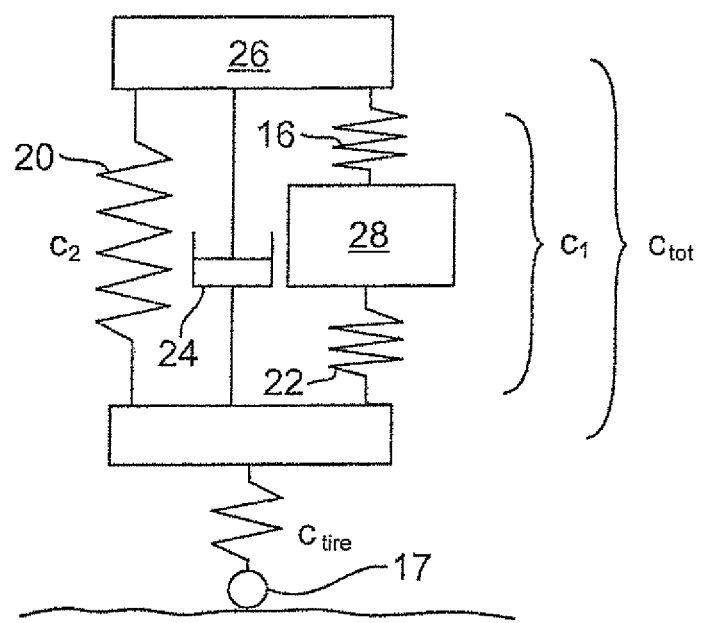
FIG. 2 is an equivalent diagram of the suspension arrangement of FIG. 1 illustrating individual spring constants $c_1$ and $c_2$, which essentially determine the total spring rate.

The left-side wheel suspension shown in FIG. 1 has a telescopic shock absorber 24 with a separate support spring 20, which is shown only in the equivalent model of FIG. 2. The spring arrangement according to the invention is composed in accordance with FIG. 1 of a torsion bar spring 22 extending in the vehicle's transverse direction and forming a storage spring of yet to be described construction.

The telescopic shock absorber 24 is supported on the lower transverse control arm 12 and at the top on the body 26 of the motor vehicle (not illustrated), on which the subframe 14 is also mounted on vibration-isolation bearings.

The torsion bar spring 22 is composed, as shown in FIG. 1 by way of example, of a radially outer tubular spring 22a, which extends—starting from an actuator 28 mounted on the subframe 14—inwardly to proximate the depicted vehicle's perpendicular longitudinal center plane 18, where it is drivingly connected to a solid bar 22b made of spring steel, for example by way of a plug-in connection 32.

The solid bar 22b extends radially inward again to the outside of the vehicle, where it passes through the actuator 28 and is attached, also by way of a plug-in connection 36, to a farther outward guide bushing 34.

The guide bushing 34 is rotatably supported in the actuator 28 and has an output lever 38 that projects in relation to the control arm 12 radially forwardly in the direction of travel F of the motor vehicle, wherein the output lever 38 is pivotally connected to the control arm 12 via bearings 42 and an approximately vertically aligned coupling rod 40.

The actuator 28 is a motor-gear unit composed, as only schematically indicated by the reference numeral 29, of a driving electric motor and a high-gear-ratio gearbox (for example, a harmonic drive gearbox or a cycloid gearbox), wherein the output element of the transmission is drivingly connected to the tubular spring 22a. The length of the effective torsion bar spring 22 which also determines the spring rate is thus determined cumulatively from the length of the tubular spring 22a from the actuator 28 to the plug-in connection 32 and the length of the solid bar 22b between the plug-in connections 32, 36.

In addition, the housing 31 of the actuator 28 is supported in a slide bearing 33 for movement in a circumferential direction and supported on the vehicle body 26 and the subframe 14 by a spring element 16 (FIGS. 2 to 5) in the direction of the torsional moments acting on the torsion bar spring 22. The spring rate of the spring element 16 is superimposed on the spring rate of the torsion bar spring 22 in form of a serial connection.

Figure 3:
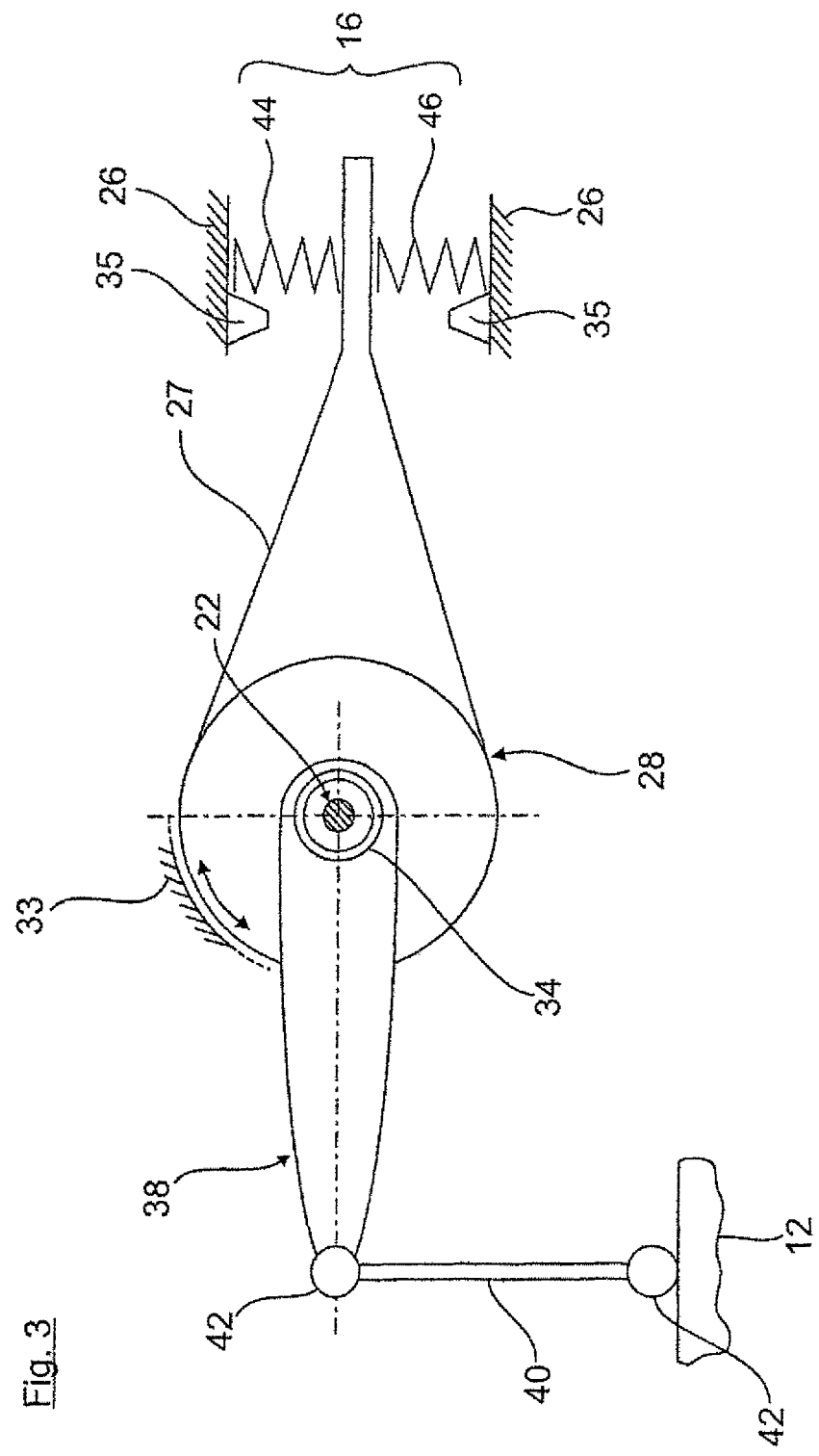
FIG. 3 is the torsion bar spring arrangement according to the present invention in a side view.

A radially outwardly projecting lever 27 is formed on the slideably mounted housing 31 of the actuator 28, as shown in FIG. 3, which is clamped at its free end between two coil compression springs 44, 46 as spring element 16. The coil compression springs 44, 46 are in turn supported on the vehicle body 26 with a defined pre-tension.

Furthermore, two rubber-elastic buffers 35 are inserted between the vehicle body 26 and the lever 27 which acts as progressive end stops. Depending on the structural conditions, the lever 27 can be aligned on the vehicle body 26 or on the subframe 14 horizontally, vertically or inclined.

The length of the lever 27, the design of the coil compression springs 44, 46 and the design of the torsion bar spring 22 determine the overall torsional stiffness or the spring rate of the torsion bar spring arrangement, which can be provided in the wheel suspension of the motor vehicle to operate as a storage spring for the support spring 20 and can be used both as a stabilizer as well as for adjusting the vehicle height and for pitch and roll stabilization of the body of the motor vehicle.

The motor-gear unit and/or the actuator 28 inserted in the force flow between the torsion bar spring 22 and the spring element 16 operates here due to the rotary support on both the torsion bar spring 22 and the spring element 16 and enables through appropriate adjustment by way of the actuator 28 a matched torsional stiffness of the torsion bar spring arrangement even at high-frequency suspension movements.

FIG. 2 shows in the equivalent diagram the interaction of the spring arrangement of a wheel suspension 10, using the same reference symbols.

As can be seen, the parallel-connected spring systems $c_2$ (support spring 20) and $c_1$ (the torsion bar spring 22 and, connected in series, the spring element 16) are effective between the body 26 of the motor vehicle and the wheel 17 and the transverse control arm 12, respectively, which determine the overall spring rate $c_{tot}$ (shown for the sake of completeness is also the spring rate $c_{tire}$ of the wheel 17 and the tire, respectively).

With the series connection of the torsion bar spring 22 and the spring element 16, the spring rate $c_1$ controlled via the actuator 28 can be reduced as storage spring and thus also the overall spring rate $c_{tot}$ and advantageously adapted to design conditions, as needed.

Figure 4:
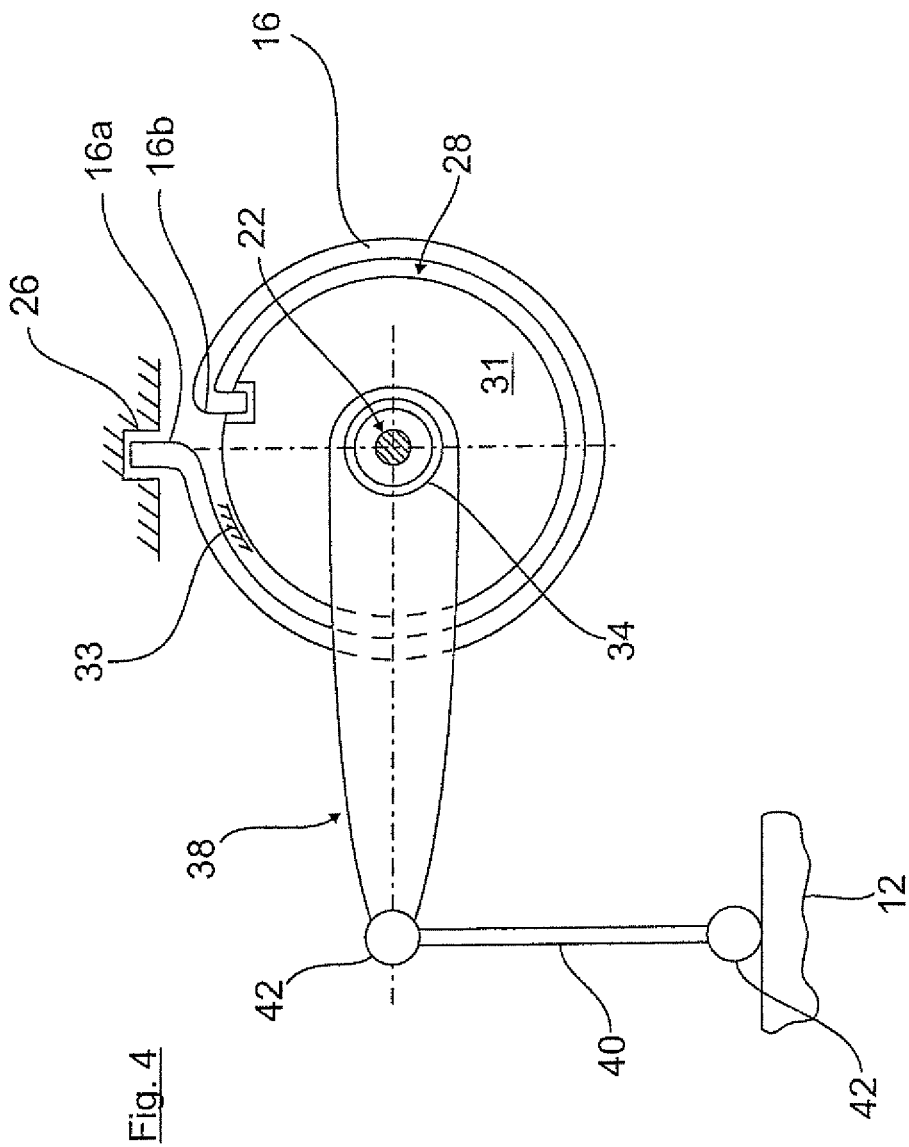
FIG. 4 is another torsion bar spring arrangement according to the present invention in a view corresponding to FIG. 3.

FIG. 4 shows an alternative embodiment of the invention, which is only described insofar as it differs significantly from the embodiment according to FIG. 1. Functionally identical parts are provided with the same reference symbols.

According to FIG. 4, the additional spring element 16 is formed as a coil spring which is arranged around the motor-gear unit of the actuator 28 and whose angled spring ends 16*a*, 16*b* are anchored on the vehicle body 26 and on the housing 31 under a defined pre-tension in the circumferential direction of the housing 31.

Figure 5:
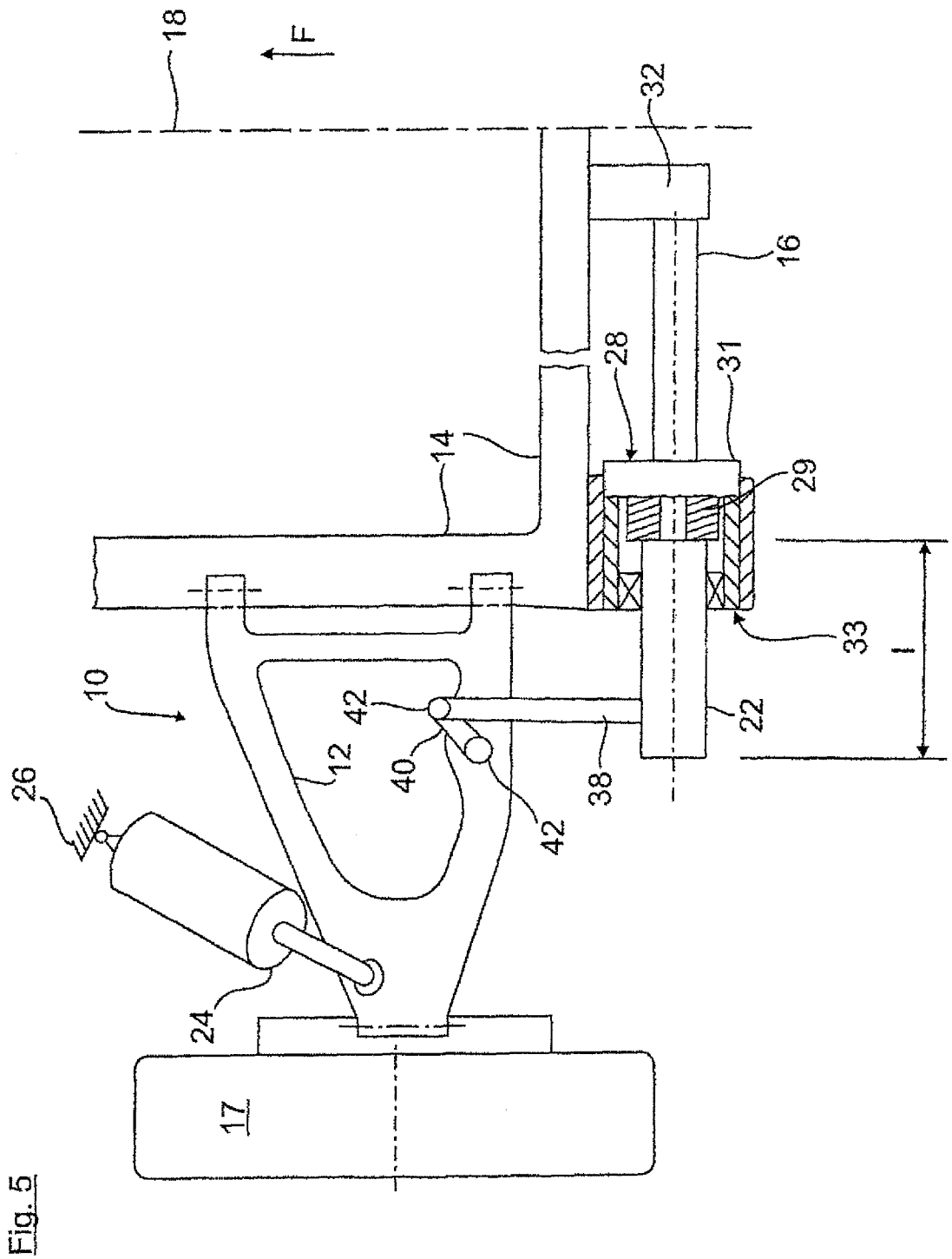
FIG. 5 is a torsion bar spring arrangement according to the present invention in a view corresponding to FIG. 1.

The structure and operation of the torsion bar spring arrangement shown in FIG. 5 are substantially identical to that of the torsion bar spring arrangement shown in the preceding figures. Therefore, reference is made to the description of FIGS. 1 to 4.

In contrast to FIGS. 1 to 4, the spring element 16 in FIG. 5 is designed as a torsion bar spring. The housing 31 of the actuator 28 is supported on a torque support 32 of the subframe 14 by way of the torsion bar spring 16. The second torsion bar spring 16 is rotation-locked both with respect to the housing 31 and the torque support 32 of the vehicle-body-side subframe 14. The spring rate of the second torsion bar spring 16 is superimposed on the spring rate of the first torsion bar spring 22 in form of a serial connection.

The length l and the design (material, material thickness, etc.) of the first torsion bar spring 22 and of the second torsion bar spring 16 determine the overall torsional stiffness or the spring rate of the torsion bar spring arrangement which can be provided in the wheel suspension of the motor vehicle operating as a storage spring for the support spring 20, serving both as a stabilizer and for adjusting the vehicle height and for stabilizing pitch and roll of the body of the motor vehicle. The motor-gear unit of the actuator 28 inserted the force flow between the torsion spring bars 22 and 16 operates due to its rotary support both on the first torsion bar spring 22 and on the second torsion bar spring 16 and enables with suitable adjustment by way of the motor-gear unit of the actuator 28 dynamically sensitive and appropriately adapted torsional stiffness of the torsion spring arrangement even at high-frequency suspension movements.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A torsion bar spring arrangement for a wheel suspension of a motor vehicle, comprising:
    an actuator arranged on a vehicle body or on a subframe and constructed to variably pre-tension the torsion bar spring arrangement,
    a coaxial first torsion bar spring having an output side that is connected by way of an output lever to a wheel suspension element of the wheel suspension, and
    a housing of the actuator supported on the vehicle body in at least one bearing location for movement in a circumferential direction and resiliently yieldingly supported on the vehicle body in a direction of torsional moments acting on the torsion bar spring by way of at least one spring element comprising two opposing spring elements,
    the torsion bar spring arrangement further comprising a radially outwardly projecting lever clamped between the two opposing spring elements and attached on the housing of the actuator.

2. The torsion bar spring arrangement of claim 1, wherein the two opposing spring elements springs are formed by coil compression springs or tension springs or by rubber-elastic buffers.

3. The torsion bar spring arrangement of claim 1, wherein the at least one spring element is made of a material that is different from a material of the first torsion bar spring.

4. The torsion bar spring arrangement of claim 1, wherein the first torsion bar spring is constructed as a single piece, with a first end of the first torsion bar drivingly connected to the output lever and a second end of the first torsion bar drivingly connected to an output element of the actuator.

5. The torsion bar spring arrangement of claim 1, comprising two torsion bar spring arrangements arranged on an axle of the motor vehicle and aligned transversely to a motor vehicle's longitudinal direction, with each of the torsion bar spring arrangements having an actuator rotatably supported in a region of a vertical longitudinal center plane of the motor vehicle and the first torsion rod springs together with the output levers are positioned outwardly in relation to the vertical longitudinal center plane.

6. A torsion bar spring arrangement for a wheel suspension of a motor vehicle, comprising:
    an actuator arranged on a vehicle body or on a subframe and constructed to variably pre-tension the torsion bar spring arrangement,
    a coaxial first torsion bar spring having an output side that is connected by way of an output lever to a wheel suspension element of the wheel suspension, and
    a housing of the actuator supported on the vehicle body in at least one bearing location for movement in a circumferential direction and resiliently yieldingly supported on the vehicle body in a direction of torsional moments acting on the torsion bar spring by way of at least one spring element constructed as a coil spring arranged around the actuator and acting in two opposing rotation directions, wherein a first end of the at least one spring element is anchored on the vehicle body and an opposite second end of the at least one spring element is anchored on the housing of the actuator.

7. The torsion bar spring arrangement of claim 6, wherein the at least one spring element is made of a material that is different from a material of the first torsion bar spring.

8. The torsion bar spring arrangement of claim 6, wherein the first torsion bar spring is constructed as a single piece, with a first end of the first torsion bar drivingly connected to the output lever and a second end of the first torsion bar drivingly connected to an output element of the actuator.

9. The torsion bar spring arrangement of claim 6, comprising two torsion bar spring arrangements arranged on an axle of the motor vehicle and aligned transversely to a motor vehicle's longitudinal direction, with each of the torsion bar spring arrangements having an actuator rotatably supported in a region of a vertical longitudinal center plane of the motor vehicle and the first torsion rod springs together with the output levers are positioned outwardly in relation to the vertical longitudinal center plane.

10. A torsion bar spring arrangement for a wheel suspension of a motor vehicle, comprising:
   an actuator arranged on a vehicle body or on a subframe and constructed to variably pre-tension the torsion bar spring arrangement,
   a coaxial first torsion bar spring having an output side that is connected by way of an output lever to a wheel suspension element of the wheel suspension, and
   a housing of the actuator supported on the vehicle body in at least one bearing location for movement in a circumferential direction and resiliently yieldingly supported on the vehicle body in a direction of torsional moments acting on the torsion bar spring by way of at least one spring element,
   wherein the housing of the actuator is attached by way of the at least one spring element to a torque support of the vehicle body, and
   wherein the at least one spring element is a second torsion bar spring having a first end connected to the housing and a second end supported by way of the torque support on the vehicle body.

11. The torsion bar spring arrangement of claim 10, wherein the first torsion bar spring and at least one of the second torsion bar spring and the housing of the actuator are formed coaxially in relation to each other.

12. The torsion bar spring arrangement of claim 10, wherein the first torsion bar spring and the second torsion bar spring are disposed on opposite end faces of the housing of the actuator.

13. The torsion bar spring arrangement of claim 10, wherein the at least one spring element is made of a material that is different from a material of the first torsion bar spring.

14. The torsion bar spring arrangement of claim 10, wherein the first torsion bar spring is constructed as a single piece, with a first end of the first torsion bar drivingly connected to the output lever and a second end of the first torsion bar drivingly connected to an output element of the actuator.

15. The torsion bar spring arrangement of claim 10, comprising two torsion bar spring arrangements arranged on an axle of the motor vehicle and aligned transversely to a motor vehicle's longitudinal direction, with each of the torsion bar spring arrangements having an actuator rotatably supported in a region of a vertical longitudinal center plane of the motor vehicle and the first torsion rod springs together with the output levers are positioned outwardly in relation to the vertical longitudinal center plane.

* * * * *

UNITED STATES PATENT AND TRADEMARK OFFICE
CERTIFICATE OF CORRECTION

PATENT NO. : 9,108,482 B2  
APPLICATION NO. : 14/181269  
DATED : August 18, 2015  
INVENTOR(S) : Dominik Mohrlock et al.

Page 1 of 1

It is certified that error appears in the above-identified patent and that said Letters Patent is hereby corrected as shown below:

On page 2, column 4, under FOREIGN PATENT DOCUMENTS: please delete second patent document "DE 10 2006 31 414, 1/2007".

Signed and Sealed this  
Fifth Day of July, 2016

Michelle K. Lee  
*Director of the United States Patent and Trademark Office*